US010623234B2

United States Patent
Krigsman et al.

(10) Patent No.: US 10,623,234 B2
(45) Date of Patent: Apr. 14, 2020

(54) MANAGING ALERTS REGARDING ADDITIONS TO USER GROUPS

(71) Applicant: Microsoft Technology Licensing, LLC, Redmond, WA (US)

(72) Inventors: Sivan Krigsman, Herzliya (IL); Tal Be'ery, Petah Tikva (IL); Itai Grady, Ramat HaSharon (IL); Yaron Kaner, Tel Aviv (IL); Amit Rosenzweig, Tel Aviv (IL); Tom Jurgenson, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/617,975

(22) Filed: Jun. 8, 2017

(65) Prior Publication Data
US 2018/0359136 A1    Dec. 13, 2018

(51) Int. Cl.
*G06N 20/00*     (2019.01)
*H04W 4/08*      (2009.01)
(Continued)

(52) U.S. Cl.
CPC ........ *H04L 41/0604* (2013.01); *G06F 21/552* (2013.01); *G06N 20/00* (2019.01);
(Continued)

(58) Field of Classification Search
None
See application file for complete search history.

(56) References Cited

U.S. PATENT DOCUMENTS 8,862,524 B2   10/2014   Zheng et al.
9,197,660 B2   11/2015   Sun et al.
(Continued)

FOREIGN PATENT DOCUMENTS

EP    2383946 A1    11/2011

OTHER PUBLICATIONS

"RSA ESA Rules or Alerts", https://community.rsa.com/docs/DOC-43401, Published on: May 25, 2016, 31 pages.
(Continued)

*Primary Examiner* — Clayton R Williams
*Assistant Examiner* — Christopher B Robinson
(74) *Attorney, Agent, or Firm* — Mannava & Kang, P.C.

(57) ABSTRACT

According to examples, an apparatus for managing alerts pertaining to additions of users to a user group in a computer network may include a processor and a memory, which may have stored thereon machine readable instructions that are to cause the processor to, during a learning period, identify an entity that added a user to the user group during the learning period and enter an identification of the identified entity into an allowed entity list for the user group. Following the learning period, the instructions are to cause the processor to identify a user addition event that indicates that an adding entity added another user to the user group, determine whether the adding entity is in the allowed entity list, and manage issuance of an alert regarding the user addition event based upon whether the adding entity is in the allowed entity list to reduce a number of issued alerts.

20 Claims, 4 Drawing Sheets

(51) Int. Cl.
*H04L 12/24* (2006.01)
*H04L 29/06* (2006.01)
*G06F 21/55* (2013.01)

(52) U.S. Cl.
CPC .......... *H04L 63/101* (2013.01); *H04L 63/104* (2013.01); *H04L 63/1425* (2013.01); *H04W 4/08* (2013.01); *H04L 63/065* (2013.01)

(56) References Cited

U.S. PATENT DOCUMENTS

| | | | |
|---|---|---|---|
| 9,231,962 B1 | 1/2016 | Yen et al. | |
| 2003/0008674 A1* | 1/2003 | Cudak | H04W 8/186 455/466 |
| 2007/0100647 A1* | 5/2007 | Dekel | G06Q 10/10 709/220 |
| 2007/0162588 A1* | 7/2007 | Wu | H04W 4/08 709/223 |
| 2008/0282326 A1 | 11/2008 | Miller et al. | |
| 2011/0258316 A1* | 10/2011 | Rizk | G06Q 30/02 709/225 |
| 2012/0331568 A1* | 12/2012 | Weinstein | H04L 12/185 726/29 |
| 2013/0173798 A1* | 7/2013 | Micucci | H04L 67/1044 709/225 |
| 2013/0191723 A1* | 7/2013 | Pappas | G06F 16/86 715/234 |
| 2013/0326623 A1 | 12/2013 | Kruglick | |
| 2014/0122605 A1* | 5/2014 | Merom | G06Q 10/10 709/204 |

OTHER PUBLICATIONS

"User Activity Monitoring with Log & Event Manager", https://web.archive.org/web/20160803141501/http://www.solarwinds.com/topics/user-activity-monitoring, Published on: Aug. 8, 2016, 3 pages.

"Monitor privileged accounts for suspicious activity", https://docs.splunk.com/Documentation/ES/4.6.0/Usecases/PrivilegedUsers, Retrieved on: Mar. 22, 2017, 2 pages.

"Securing Active Directory Administrative Groups and Accounts", https://msdn.microsoft.com/en-us/library/cc875827.aspx, Retrieved on: Mar. 22, 2017, 21 pages.

Kater, et ai., "You Shall Not Pass: Detecting Malicious Users at Registration Time", In Proceedings of the 1st International Workshop on Online Safety, May 22, 2016, 6 pages.

"International Search Report and Written opinion Issued in PCT Application No. PCT/US2018/034012", dated Nov. 14, 2018, 10 Pages. (MS# 401983-WO-PCT).

* cited by examiner

MANAGING ALERTS REGARDING ADDITIONS TO USER GROUPS

BACKGROUND

Computer network administration often includes operations to maximize authorized access without generating excessive network traffic due to maintaining a record of users authorized to access a particular network resource and frequently updating the records. In simple cases, each resource maintains its own list of authorized users, and upon receiving a request for service checks the list to prevent security breaches due to access by unauthorized users. Users of a computer network are often organized into groups, which generally reduces the number of list entries that have to be checked by a resource (and updated by the system) prior to granting access to the resource.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
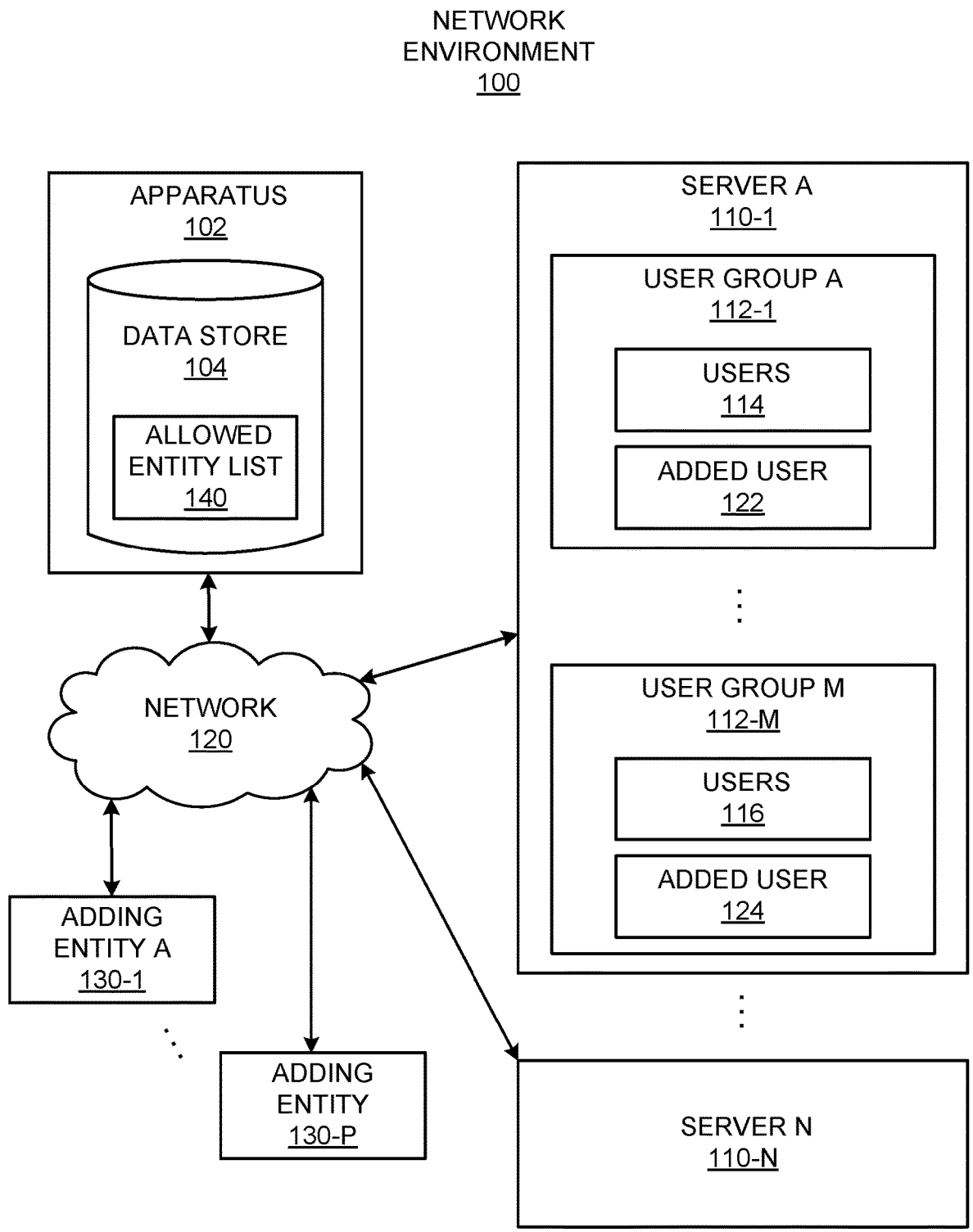
FIG. 1 shows a block diagram of a network environment in which an apparatus for managing alerts pertaining to additions of users may be implemented in accordance with an embodiment of the present disclosure.

For simplicity and illustrative purposes, the present disclosure is described by referring mainly to embodiments. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A domain may be defined as an administrative unit corresponding to a security boundary. Computers in a domain may share physical proximity on a local area network (LAN) or may be located in different geographic parts of the world and communicate over various types of physical connections, including ISDN, fiber, Ethernet, Token Ring, frame relay, satellite, and leased lines, etc. Domain administrators typically create one user account for each user within a domain and the users log on to the domain rather than repeatedly logging on to various individual resources in the domain. In addition, a domain controller may control various aspects of the domain such as individual use of resources on the domain. The users may access resources in the domain subject to user rights, privileges and system-wide policies. There may be predefined (built-in) user groups with sets of assigned user rights and domain administrators may assign user rights by adding a user account to one of the predefined user groups or by creating a new group and assigning specific user rights to that user group. Users who are subsequently added to a user group may automatically gain all user rights assigned to that user group.

Disclosed herein are apparatuses and methods for managing alerts pertaining to additions of users to a user group in a computer network, such as a domain. Particularly, the apparatuses and methods disclosed herein may determine whether a user addition to a user group is benign or abnormal (e.g., potentially malicious) and an alert may be issued in response to a determination that the user addition is abnormal. In one regard, a user addition to a user group may be construed as being benign if the addition is to a non-sensitive user group or if the addition is to a sensitive user group by an authorized adding entity. In this regard, the number of alerts that may be issued regarding a user addition to a user group may be reduced compared with conventional systems that may issue alerts each time that a user is added to a user group.

As discussed herein, the entities that are authorized (or allowed) to add users to a user group may be identified during a learning period. During the learning period, the normal operations or past behavior of an organization may be determined and the entities that have added users during the learning period may be entered into an allowed entity list. That is, the entities that have added users to the user group during the learning period may be construed as being authorized to add users to the group. Following the learning period, an entity that has added a user to the group may be compared with the entities listed in the allowed entities list to determine whether the entity is allowed to add the user to the group. Based upon the determination as to whether the entity is listed in the allowed entities list, issuance of an alert may be managed. For instance, if the entity is listed in the allowed entities list, an alert may not be issued. In addition, if the entity is not listed in the allowed entities list, an alert indicating that an abnormal user addition has been made may be issued.

However, in some examples, the alert may not be issued in instances in which the entity is not listed in the allowed entities list. For instance, when the entity is a computer account of a domain controller, the alert may not be issued. As another example, if the user group to which the user was added is not a sensitive user group, the alert may not be issued. A sensitive user group may be a group of users that may have access to sensitive or privileged data in the organization, e.g., a domain administrator group. By way of example, the sensitive or privileged data in the organization may be data that has not been publicly disclosed such as financial data, secret information, etc. In one regard, the alert may be issued when the group to which the user is added is a sensitive user group because malicious entities may attempt to attack the sensitive user group to escalate their privileges and maintain persistency over the domain. However, the addition of users by a malicious entity to non-sensitive user groups may not enable the added users to access sensitive information or have privileges over sensitive resources and thus, an alert may not be issued in these instances.

A technical problem associated with conventional alerting methods and apparatuses is that they often issue alerts each time a new user is added to a user group. This may result in a relatively large number of alerts being issued, many of which may not result from abnormal user additions, e.g., the alerts may result from benign user additions. As such, in conventional alerting methods and systems, system resources may be utilized unnecessarily to issue the alerts. Additionally, the issuance of the large number of alerts may make it difficult for operators to distinguish between alerts that they may be required to act upon and benign alerts.

According to embodiments disclosed herein, benign user additions may be distinguished from abnormal user additions and the alerts may be issued when the user additions are determined to be abnormal, which may reduce the number of alerts that are issued. As such, a technical solution to the technical problem noted above may be that system resource utilization, e.g., processor utilization, network utilization, etc., to generate and issue the alerts may be reduced. In addition or in other examples, the system resource utilization to generate and issue the alerts may be minimized by solely issuing the alerts when abnormal additions are detected. In any regard, the reduction in the number of issued alerts may also enable operators to focus on alerts for which they may need to act upon.

Reference is made first to FIG. 1, which shows a block diagram of a network environment 100 in which an apparatus 102 for managing alerts pertaining to additions of users to a user group may be implemented, in accordance with an embodiment of the present disclosure. It should be understood that the network environment 100 depicted in FIG. 1 may include additional components and that some of the components described herein may be removed and/or modified without departing from scopes of the network environment 100.

As shown in FIG. 1, in addition to the apparatus 102, the network environment 100 may also include a plurality of servers 110-1 to 110-N, in which the variable "N" may represent a value greater than one. The apparatus 102 may be a computer, a virtual machine, a distributed set of computers or virtual machines, etc. In addition, the apparatus 102 may be housed in a common data center as the servers 110 or may be housed separately from the servers 110, e.g., in another data center. In any regard, each of the servers 110 may be hardware servers, server blades, virtual machines running on physical computers, combinations thereof, or the like. Generally speaking, the servers 110 may store and execute applications that clients may access over a network 120. The network 120 may be an intranet, the Internet, and/or a combination thereof. By way of particular example, the network environment 100 may be a network environment of an organization.

According to examples, different users in an organization may have different access rights to content and applications running on the servers 110. For instance, some users may have domain administrative rights, some users may have rights to access and modify certain records, some users may only have rights to certain applications, and so forth. The users may be identified in various user groups 112-1 to 112-M, in which the variable "M" may represent a value greater than one. One user group 112-1 may include users 114 that have domain administrative rights. The user group 112-1 may be a sensitive user group because the users 114 in that user group 112-1 may have access to sensitive or privileged data in the organization. By way of example, the sensitive or privileged data in the organization may be data that has not been publicly disclosed such as financial data, secret information, etc. In other words, the users 114 in the user group 112-1 may have full control of a domain composed of the servers 110. The other user groups 112-2 to 112-M may include users 116 that have other levels of access and/or rights in the domain. For instance, the user group 112-M may be a non-sensitive user group because the users 116 in that user group 112-M may not have access to sensitive or privileged data and/or may not have administrative rights in a network.

According to examples, adding entities 130-1 to 130-P, in which the variable "P" may represent a value greater than one, may add users 122 to the user group 112-1, may add users 124 to the user group 112-M, etc. The adding entities 130 may represent client machines that adding users may use to add the users 122, 124 to the user groups 112. The adding entities 130 may also or in other examples represent users of client machines that have been implemented to add the users 122, 124. In some instances, an adding entity 130-1 may be a user that is authorized to add the users 122, 124 to either or both of a sensitive user group 112-1 and a non-sensitive user group 112-M. In other instances, an adding entity 130-1 may be a user that has maliciously added a user 122, 124 to a sensitive user group 112-1 and a non-sensitive user group 112-M. An adding entity 130-1 may add the user 122 to the sensitive user group 112-1 as a way to attack the domain of the network environment 100. That is, an adding entity 130-1 may add the user 122 to the sensitive user group 112-1 as a way to escalate a malicious user's privileges and maintain persistency over the domain. An adding entity 130-1 may also add the user 124 to a non-sensitive user group 112-M.

According to embodiments disclosed herein, the apparatus 102 may discriminate between benign and malicious user additions to the user groups 112-1 to 112-M. As used herein, a benign user addition may be a user addition to either or both of a sensitive user group 112-1 and a non-sensitive user group 112-M that is made by an adding entity 130-1 to 130-P that is authorized to make the addition. As also used herein, a benign user addition may additionally be a user addition to a non-sensitive user group 112-M that is made by an adding entity 130-1 to 130-P that is not authorized to make the addition, e.g., an abnormal or malicious entity. As further used herein, a malicious user addition may be a user addition to a sensitive user group 112-1 that is made by an adding entity 130-1 that is not authorized to make the addition.

As disclosed herein, a determination as to whether an adding entity 130-1 is authorized or is not authorized to make the user addition may be made based upon data collected during a learning period. That is, during the learning period, the apparatus 102 may generate and update an allowed entity list 140 that lists adding entities 130 that the apparatus 102 may have learned or identified as being allowed to add users to at least one of the user groups 112. Following the learning period, the apparatus 102 may identify, from a user addition event, an adding entity 130-1 that has added a user 122, 124 to a user group 112-1, 112-M. In addition, the apparatus 102 may determine whether the adding entity 130-1 is listed in the allowed entity list 140 and manage issuance of an alert regarding the user addition event based upon whether the adding entity is in the allowed entity list 140. In some examples, the allowed entity list 140 may list a username of an adding entity along with the user group or groups to which the adding entity is authorized to add users. Thus, for instance, the allowed entity list 140 may include a listing that indicates that a user name of an adding entity is authorized to add users to non-sensitive user groups but is not authorized to add users to sensitive user groups.

Figure 2:
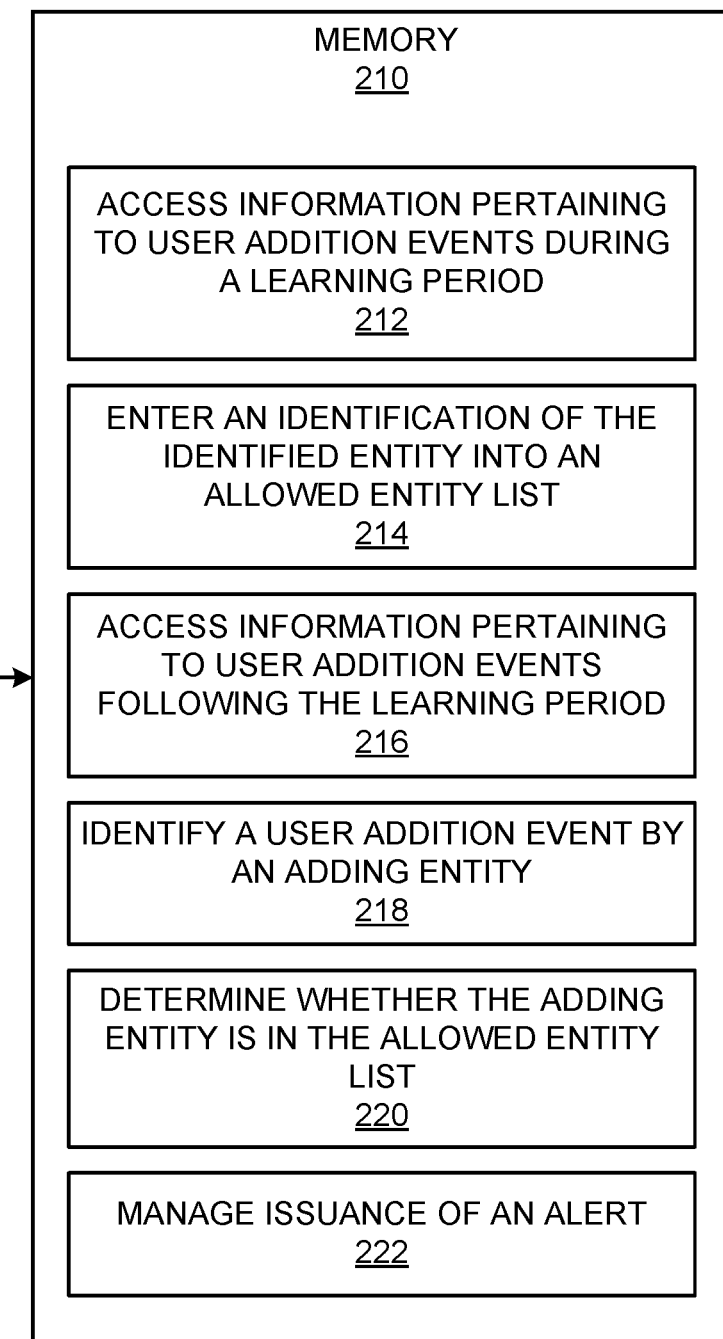
FIG. 2 shows a block diagram of an apparatus for managing alerts in accordance with an embodiment of the present disclosure.

Turning now to FIG. 2, there is shown a block diagram of an apparatus 102 for managing alerts according to an embodiment of the present disclosure. The apparatus 102 may be equivalent to the apparatus 102 discussed above with respect to FIG. 1 and the description of the apparatus 102 is made with respect to FIGS. 1 and 2. As shown in FIG. 2, the apparatus 102 may include a processor 202 that may control operations of the apparatus 102. The processor 202 may be a semiconductor-based microprocessor, a central processing unit (CPU), an application specific integrated circuit (ASIC), a field-programmable gate array (FPGA), and/or other suitable hardware device. The processor 202 may access a data store 104, which may be a Random Access Memory (RAM), an Electrically Erasable Programmable Read-Only Memory EEPROM), a storage device, an optical disc, and the like. The processor 202 may also access an interface 206 through which the processor 202 may communicate with the servers 110. The interface 206 may be any suitable hardware and/or software that enable the processor 202 to communicate over a network 120.

The apparatus 102 may also include a memory 210 that may have stored thereon machine readable instructions 212-222 (which may also be termed computer readable instructions) that the processor 202 may execute. The memory 210 may be an electronic, magnetic, optical, or other physical storage device that contains or stores executable instructions. The memory 210 may be, for example, Random Access memory (RAM), an Electrically Erasable Programmable Read-Only Memory (EEPROM), a storage device, an optical disc, and the like. The memory 210, which may also be referred to as a computer readable storage medium, may be a non-transitory machine-readable storage medium, where the term "non-transitory" does not encompass transitory propagating signals.

The processor 202 may fetch, decode, and execute the instructions 212 to access information pertaining to user addition events during a learning period to learn an identity of an entity that added a user to a user group 112. The processor 202 may fetch, decode, and execute the instructions 214 to enter an identification of the identified entity into an allowed entity list 140. The processor 202 may fetch, decode, and execute the instructions 216 to access information pertaining to user addition events following the learning period. The processor 202 may fetch, decode, and execute the instructions 218 to identify a user addition event by an entity after the learning period. The processor 202 may fetch, decode, and execute the instructions 220 to determine whether the entity is listed in the allowed entity list 140. The processor 202 may fetch, decode, and execute the instructions 222 to manage issuance of an alert based upon whether the entity is listed in the allowed entity list.

Figure 3:
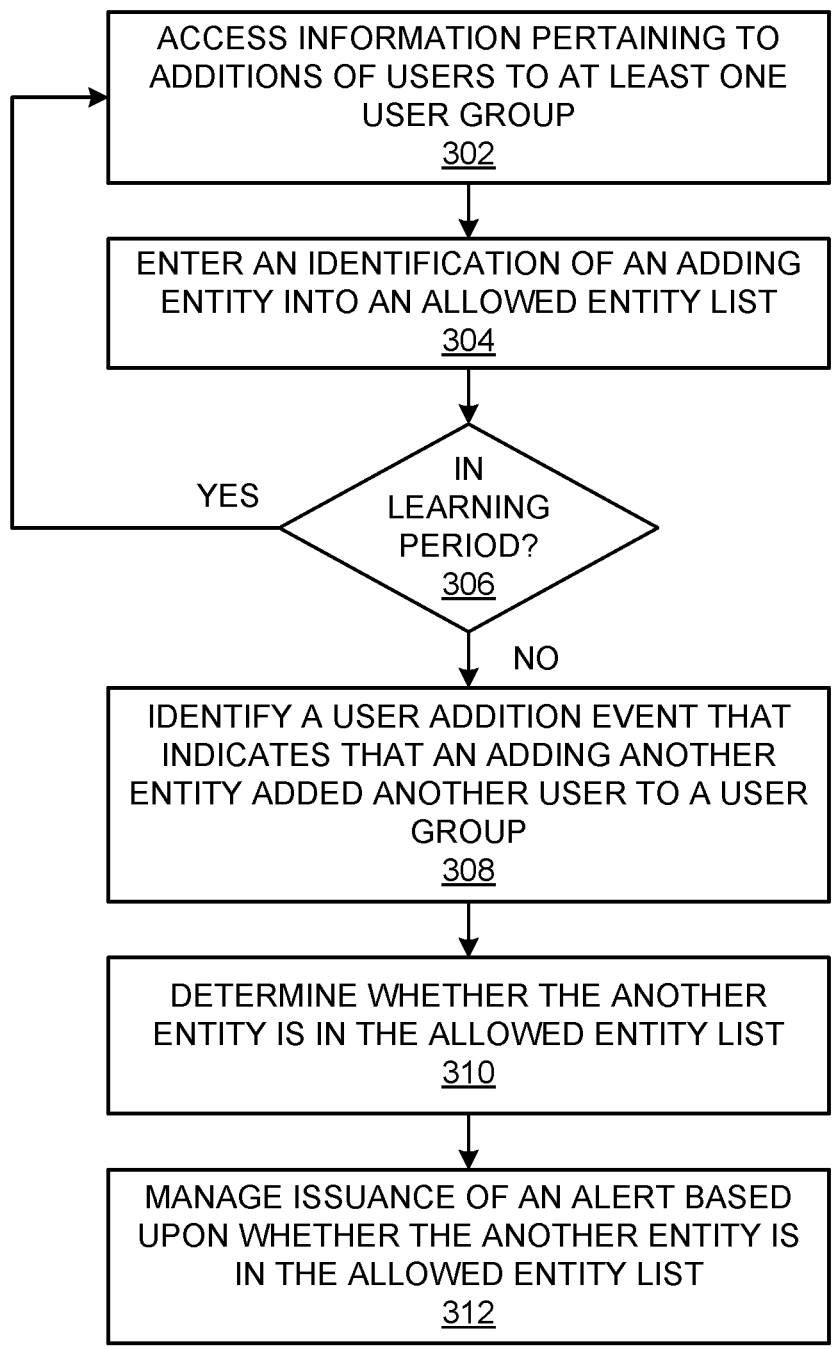
FIGS. 3 and 4, respectively, depict flow diagrams of methods for managing alerts pertaining to additions of users to at least one user group in accordance with embodiments of the present disclosure.
Figure 4:
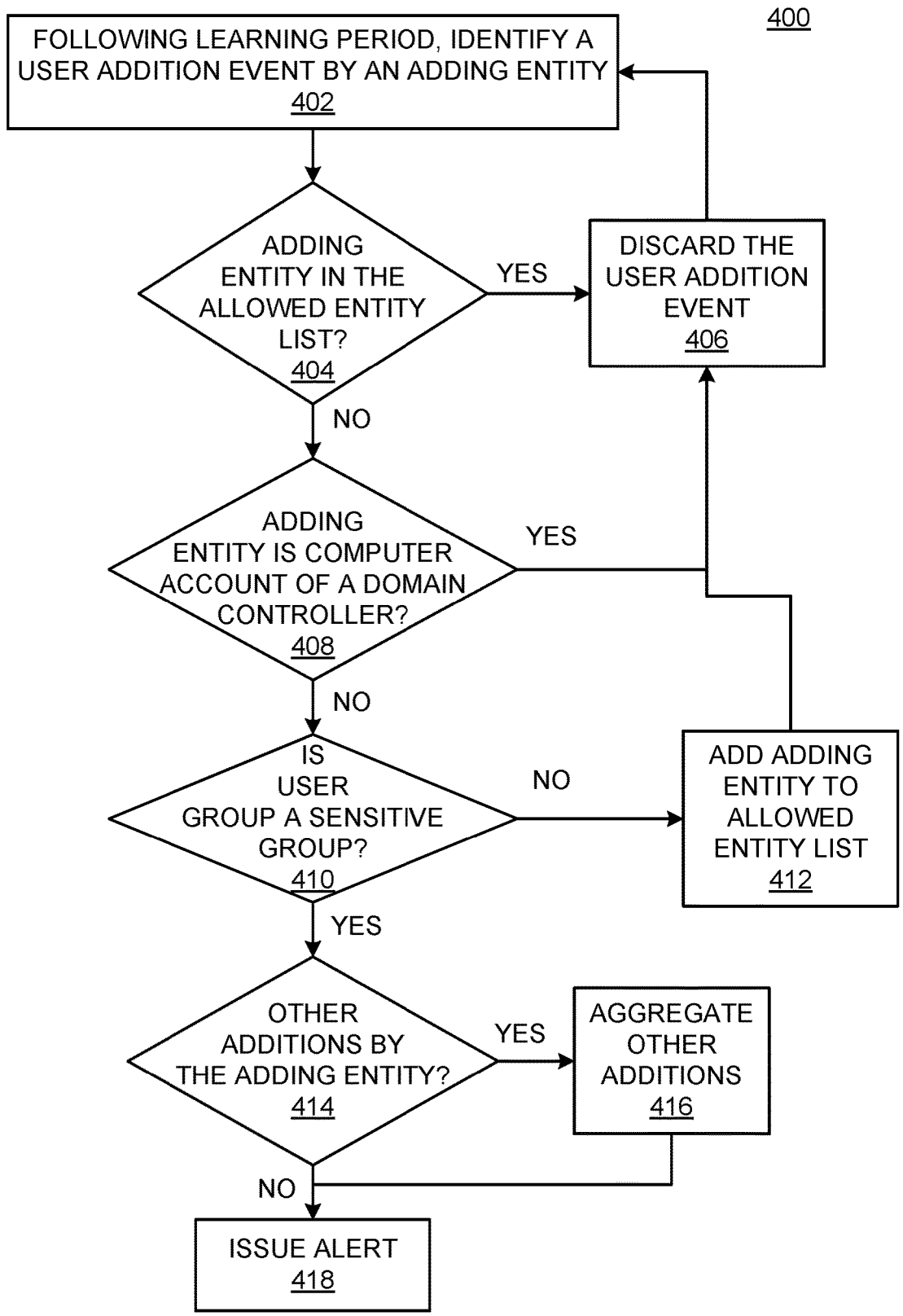

Various manners in which the processor 202 may operate to manage issuance of alerts are discussed in greater detail with respect to the methods 300 and 400 depicted in FIGS. 3 and 4. Particularly, FIGS. 3 and 4, respectively, depict flow diagrams of methods 300 and 400 for managing alerts pertaining to additions of users to at least one user group 112 according to an embodiment of the present disclosure. It should be understood that the methods 300 and 400 depicted in FIGS. 3 and 4 may include additional operations and that some of the operations described therein may be removed and/or modified without departing from scopes of the methods 300 and 400. The descriptions of the methods 300 and 400 are also made with reference to the features depicted in FIGS. 1 and 2 for purposes of illustration.

At block 302, the processor 202 may execute the instructions 212 to access information pertaining to additions of users 122, 124 to at least one user group 112 over a predefined period of time. During the predefined period of time, the processor 202 may identify adding entities 130 that are allowed to add users to the at least one user group 112. For instance, the processor 202 may identify which adding entities 130 are allowed to add users to non-sensitive user groups and which of the adding entites 130 are allowed to add users to sensitive user groups during the predefined period of time.

The number of allowed entities 130 that may be identified as being allowed to add users may vary depending upon the duration of the predefined period of time. For instance, there may be a direct relationship such that a greater number of allowed entities 130 may be identified with a longer duration of the predefined period of time. The duration of the predefined period of time may be equivalent to a learning period and may be set based upon any of a number of considerations. For instance, the duration of the predefined period of time may be set based upon a network structure of an organization and may thus differ for different types of network structures. By way of example, the duration of the predefined period of time may be shorter for an organization in which there are a larger number of user additions than for an organization in which there are a shorter number of user additions. As a non-limiting example, the duration of the predefined period of time may be from about 1 week to about 8 weeks.

The processor 202 may access the information at block 302 from any of a number of data sources as well as a combination of data sources. The processor 202 may extract data from events identified by the accessed information. The events may be user addition events and the extracted data may include, for instance, a security identifier of an added user, a group security identifier, a subject user security identifier of the adding entity, a target security identifier of an added group, a subject logon identifier, a domain controller name, a time at which the event occurred, etc.

In some examples, the processor 202 may listen to network traffic to domain controllers to access the information. The processor 202 may extract, from the network traffic, events that identify a managing user (e.g., an adding entity), a managed user (e.g., an added user), a group to which a user was added, a source machine, and a target machine. In certain instances, the network traffic information may be encrypted and the processor 202 may include a key to decrypt the network traffic information. By way of example, the processor 202 may function as a domain controller and may include the corresponding key or keys to decrypt the network traffic information. In addition, because the network traffic may include multiple types of events, the processor 202 may filter out the events that are not user addition events.

In some examples, the processor 202 may access the information at block 302 from an active directory, for instance, by replicating the active directory data. The active directory may be a repository for all of the data in an organization. The processor 202 may compare the active directory data from one point in time with the active directory data at another point in time to determine which users have been added to which groups between the points of time. In some instances, the active directory may identify actions that have occurred with regard to the data in the organization, but may not identify the user that performed the actions. Additional operations may thus be implemented to identify the users of the actions, such as considering other sources of information to identify users that may have performed those actions at the times of the actions. According to examples, the processor 202 may perform the additional operations to identify the entities that added users to the groups during the learning period from the active directory information.

In some examples, the processor 202 may access the information at block 302 from an event log or from multiple event logs. An event log may be, for instance, an audit log of an active directory that has several events that describe manipulations on groups, such as adding users to and removing users from groups. There may be three types of events, all with the same logical action but with different types of groups. The different types of groups may be local groups, which may be related to particular servers, global groups, which may be related to particular domains, and universal groups, which may be related to multiple domains. The event log may include, for each action, the adding entity that performed the addition of a user to a user group, the user group to which the user addition was made, the target machine to which a user addition was made, which domain controller on which server that the user addition occurred, etc.

At block 304, the processor 202 may execute the instructions 214 to enter the identification of an adding entity into an allowed entity list 140. The allowed entity list 140 may include information pertaining to adding entities 130 that are allowed to add users 122, 124 to one of or more of the user groups 112. As examples, the allowed entity list 140 may identify which adding entities are allowed to add users to which of the user groups 112. For instance, the allowed entity list 140 may identify an adding entity 130-1 as being allowed to add users to a first user group 112-1 but not to a second user group 112-2.

In any regard, the allowed entity list 140 may be stored as a table or in another form in a data store 104 and at block 304, the processor 202 may enter identifications of the entities 130 that have added users 122, 124 to the user groups 112 during the learning period. The identifications of the entities 130 may be any one or more of user names, security identifiers of the adding entities 130, etc. The processor 202 may enter the identifications of the entities 130 along with the user groups 112 to which they are allowed to add users. In any regard, the allowed entity list 140 may list the entities that are allowed to add users to the groups 112 in a manner that may be referenced at a later time.

At block 306, the processor 202 may execute the instructions 212 to determine whether the learning period has expired. In response to a determination that the learning period has not expired, e.g., that the processor 202 is still in the learning period, the processor 202 may repeat blocks 302-306. In addition, the processor 202 may repeat blocks 302-306 to continue to determine and enter allowed adding entities 130 into the allowed entity list 140 until a determination is made that the learning period has expired. The processor 202 may not enter duplicate adding entities 130 or may replace existing entries when adding entities 130 to be entered have previously been entered into the allowed entity list 140.

At block 308, following expiration of the learning period (or, equivalently, expiration of the predefined period of time), the processor 202 may execute the instructions 218 to identify a user addition event that indicates that an adding entity 130-1 added another user 122 to at least one of the user groups 112. The processor 202 may access one or more data sources to identify the user addition event, in which the one or more data sources may include the data sources discussed above with respect to block 302.

According to examples in which the event data accessed from the one or more data sources may not identify the adding entity 130-1 that added the user 122 to at least one of the user groups 112, the processor 202 may enrich the event data. That is, for instance, if the event data does not identify the adding entity in a form that is compatible with the identification of allowed entities in the allowed entity list 140, the processor 202 may enrich the event data to identify the correct format of the adding entity identification. As another example, if the event data does not identify a user name of the adding entity, the processor 202 may access the user name of the adding entity from another source, such as the active directory. The processor 202 may enrich the event data by resolving security identifiers of entities included in the event data, by querying an active directory for any user name corresponding to a security identifier listed in the event data, by resolving an adding entity's source computer based upon an IP address identified in a security event log, or the like.

At block 310, the processor 202 may execute the instructions 220 to determine whether the adding entity 130-1 that added the user 122 to at least one of the user groups 112 is in the allowed entity list 140. Thus, for instance, the processor 202 may determine whether a user name of the adding entity 130-1 is listed in the allowed entity list 140. As other examples, the processor 202 may determine whether the user name of the adding entity 130-1 is identified in the allowed entity list 140 as being allowed to add users into the user group 112-1 into which the user was added.

At block 312, the processor 202 may execute the instructions 222 to manage issuance of an alert based upon whether the adding entity 130-1 is in the allowed entity list 140 and/or whether the allowed entity list 140 indicates that the adding entity 130-1 is authorized to add the user into the user group 112-1. The processor 202 may manage the issuance of the alert by, for instance, issuing the alerts in certain instances with respect to whether the adding entity 130-1 is in the allowed entity list 140. Various manners in which the processor 202 may determine that an alert is to be issued or that a user addition event is to be discarded, e.g., that no alert is to be issued, are described in detail with respect to FIG. 4.

Turning now to FIG. 4, at block 402, following the learning period, the processor 202 may execute the instructions 218 to identify a user addition event by an adding entity 130-1. Block 402 may be equivalent to block 310 in FIG. 3. As such, for instance, the processor 202 may implement the method 400 following implementation of blocks 302-308 in the method 300.

At block 404, the processor 202 may execute the instructions 220 to determine whether the adding entity 130-1 is listed in the allowed entity list 140. As discussed above, the processor 202 may enrich data pertaining to the user addition event to determine the identification of the adding entity 130-1. In addition, the processor 202 may compare the identification of the adding entity 130-1 to the entities listed in the allowed entity list 140 to determine whether the adding entity 130-1 is listed in the allowed entity list 140. The processor 202 may also determine whether the allowed entity list 140 indicates that the adding entity 130-1 is authorized to add the user to the user group 112-1 into which the user was added.

In response to a determination that the adding entity 130-1 is listed in the allowed entity list 140 and/or that the adding entity 130-1 is authorized to add the user to the user group 112-1, the processor 202 may discard the user addition event as indicated at block 406. As discussed above, the entities listed in the allowed entity list 140 may include those entities that added users to the user groups 112 during the learning period. In addition, the processor 202 has determined those entities as being allowed to add users to those users groups 112. In this regard, the processor 202 may determine that the adding entity 130-1 that added the user 122 listed in the user addition event identified at block 402 may be allowed to add the user 122 to the user group 112-1.

However, in response to a determination at block 404 that the adding entity 130-1 is not listed in the allowed entity list 140 and/or that the adding entity 130-1 is not listed as being allowed to add users to the user group 112-1, the processor 202 may execute the instructions 220 to determine whether the adding entity 130-1 is a computer account of a domain controller at block 408. The computer account of a domain controller may have account information in the active directory and may perform some network-related actions, such as adding users to user groups 112. As these actions are normally permitted, the processor 202 may not issue an alert in response to a determination that the adding entity 130-1 is a computer account of a domain controller. Instead, the processor 202 may discard the user addition event as indicated at block 406.

In response to a determination at block 408 that the adding entity 130-1 is not a computer account of a domain controller, the processor 202 may execute the instructions 220 to determine whether the user group 112-1 to which the user 122 has been added is a sensitive user group. A sensitive user group may be defined as a group containing users that have been given access rights to sensitive or privileged information in an organization. The sensitive or privileged information may be confidential information, non-publicly disclosed information, or the like. In addition, a sensitive user group may be defined as a group containing users that have domain administrator rights, root privileges, or the like.

In response to a determination that the user group 112-1 to which the user 122 has been added is not a sensitive user group, the processor 202 may add the adding entity 130-1 to the allowed entity list 140 at block 412. For instance, the processor 202 may add an entry in the allowed entity list 140 that the adding entity 130-1 is allowed to add users to that user group. In addition, the processor 202 may discard the user addition event at block 406, e.g., may not issue an alert. However, in response to the user group 112-1 being a sensitive user group at block 410, the processor 202 may execute the instructions 222 to issue an alert at block 418. The processor 202 may issue the alert as a visual and/or audible indication of a potential threat. Thus, for instance, the alert may be a message displayed on a display, a sound outputted through a speaker, a message added to a log, a message sent in an email, or the like.

According to examples, and as may be seen from the discussion of the method 400, the processor 202 may issue the alert at block 418 after a number of conditions are met and not immediately after a user addition event into a user group has been identified. In one regard, therefore, through implementation of the method 400, the processor 202 may issue a relatively smaller number of alerts as compared to instances in which the method 400 is not implemented.

The processor 202 may further reduce the number of issued alerts by determining whether the adding entity 130-1 made other additions at block 414. In response to a determination at block 414 that the adding entity 130-1 made other additions, the processor 202 may identify the other additions and may aggregate the other additions at block 416. In addition, at block 418, the processor 202 may issue a single alert or a reduced number of alerts for the aggregated other additions at block 418.

Although blocks 404, 408, and 410 have been depicted and described as being executed in a certain order, it should be understood that these blocks 404, 408, and 410 may be rearranged with respect to each other without departing from a scope of the method 400. For instance, the processor 202 may execute block 408 and/or block 410 prior to executing block 404. By way of example, therefore, the processor 202 may determine whether the adding entity 130-1 is in the allowed entity list 140 in response to a determination that the adding entity 130-1 is not a computer account of a domain controller. As another example, the processor 202 may determine whether the adding entity is in the allowed entity list 140 in response to the user group 112-1 into which the user 122 was added being a sensitive user group.

According to examples, following issuance of the alert at block 418, the processor 202 may block the adding entity 130-1 from adding a further user to a user group, e.g., a sensitive user group. The processor 202 may block the adding entity 130-1, for instance, by adding the adding entity 130-1 to a blocked list that a domain controller may access in determining whether to enable access by the adding entity 130-1 to network resources. The processor 202 may also block the adding entity 130-1 by, for instance, revoking the adding entity's credentials to log into the network resources. The processor 202 may further block the added user identified in the user addition event at block 402. That is, the processor 202 may remove the added identified added user from the user group in response to a determination that the user addition warranted issuance of the alert at block 418.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus for managing alerts pertaining to additions of users to a user group in a computer network, said apparatus comprising:
    a processor; and
    a memory on which is stored machine readable instructions that are to cause the processor to:
        during a learning period, identify an entity that added a user to the user group during the learning period;

enter an identification of the identified entity into an allowed entity list for the user group;
following the learning period, identify a user addition event that indicates that an adding entity added another user to the user group;
determine whether the adding entity is an entity that added a user to the user group during the learning period based on the allowed entity list; and
manage issuance of an alert regarding the user addition event based upon whether the adding entity is in the allowed entity list to reduce a number of issued alerts, wherein
in response to a determination that the adding entity is an entity that added a user to the user group during the learning period based on the allowed entity list, discard the user addition event; and
in response to a determination that the adding entity is not an entity that added a user to the user group during the learning period based on the allowed entity list, issue the alert.

2. The apparatus according to claim 1, wherein the instructions are further to cause the processor to:
in response to a determination that the adding entity is not in the allowed entity list, identify other additions of users to the user group or to other user groups by the adding entity, aggregate the identified other additions with the addition indicated in the user addition event, and issue one alert for the aggregated additions to reduce the number of issued alerts.

3. The apparatus according to claim 1, wherein the instructions are further to cause the processor to:
following issuance of the alert,
remove the another user from the user group; and
block the adding entity from adding a further user to the user group.

4. The apparatus according to claim 1, wherein the instructions are further to cause the processor to:
following the learning period,
determine whether the adding entity is a computer account of a domain controller of the computer network; and
discard the user addition event in response to the adding entity being a computer account of the domain controller.

5. The apparatus according to claim 1, wherein the instructions are further to cause the processor to:
following the learning period,
determine whether the user group is a sensitive user group, wherein a sensitive user group is a group of users that has access to sensitive or privileged data of an organization; and
in response to a determination that the user group is not a sensitive user group, discard the user addition event.

6. The apparatus according to claim 5, wherein the instructions are further to cause the processor to:
in response to a determination that the user group is not a sensitive group, include the adding entity in the allowed entity list for the user group.

7. The apparatus according to claim 1, wherein the instructions are further to cause the processor to:
access a data source to identify the user addition event;
extract data from the identified user addition event; and
enrich the extracted data to identify information pertaining to the adding entity.

8. A method for managing alerts pertaining to additions of users to a user group in a computer network, the method comprising:
accessing information pertaining to additions of users to the user group over a predefined period of time, the information identifying at least one entity that added the users to the user group over the predefined period of time;
entering an identification of the at least one entity into an allowed entity list, wherein the entities in the allowed entity list are entities identified as being allowed to add users to the user group;
following expiration of the predefined period of time,
identifying, by a processor, a user addition event that indicates that an adding entity added another user to the user group;
determining whether the adding entity is an entity that added a user to the user group during the predefined period of time based on the allowed entity list; and
managing, by the processor, issuance of an alert regarding the user addition event based upon whether the allowed entity list indicates that the adding entity is allowed to add the user to reduce a number of issued alerts, wherein
in response to a determination that the adding entity is an entity that added a user to the user group during the predefined period of time based on the allowed entity list, discarding the event; and
in response to a determination that the adding entity is not an entity that added a user to the user group during the predefined period of time based on the allowed entity list, issuing the alert.

9. The method according to claim 8, further comprising:
in response to a determination that the adding entity is not in the allowed entity list, identifying other additions of users to the user group by the adding entity and aggregating the identified other additions with the issuance of the alert to reduce the number of issued alerts.

10. The method according to claim 8, further comprising:
following issuance of the alert,
removing the another user from the user group; and
blocking the adding entity from adding a further user to the user group.

11. The method according to claim 8, further comprising:
following expiration of the predefined period of time,
determining whether the adding entity is a computer account of a domain controller of the computer network; and
wherein managing the issuance of the alert further comprises not issuing the alert in response to the adding entity being a computer account of the domain controller.

12. The method according to claim 8, further comprising:
following expiration of the predefined period of time,
determining whether the user group is a sensitive user group; and
wherein managing the issuance of the alert further comprises not issuing the alert regarding the user addition event in response to a determination that the user group is a non-sensitive user group.

13. The method according to claim 12, further comprising:
in response to a determination that the user group is a non-sensitive group, including the adding entity in the allowed entity list for the user group.

14. The method according to claim 8, further comprising:
accessing a data source to identify the user addition event;
extracting data from the identified user addition event; and
enriching the extracted data to identify information pertaining to the adding entity.

15. A non-transitory computer readable medium on which is stored machine readable instructions that when executed by a processor, cause the processor to:
during a learning period,
access a data source for user addition events to a user group;
identify, from the user addition events, an entity that added a user to the user group;
enter an identification of the identified entity into an allowed entity list for the user group;
following the learning period,
identify a user addition event that indicates that an adding entity added another user to the user group;
determine whether the adding entity is an entity that added a user to the user group during the learning period based on the allowed entity list;
in response to a determination that the adding entity is an entity that added a user to the user group during the learning period based on the allowed entity list, discard the user addition event; and
in response to a determination that the adding entity is not an entity that added a user to the user group during the learning period based on the allowed entity list, issue the alert.

16. The non-transitory computer readable medium according to claim 15, wherein the instructions are further to cause the processor to:
determine whether the user group is a sensitive user group, wherein a sensitive user group is a group of users that has access to sensitive or privileged data of an organization; and
in response to a determination that the user group is not a sensitive user group, discard the user addition event without issuing the alert.

17. The non-transitory computer readable medium according to claim 16, wherein the instructions are further to cause the processor to:
in response to a determination that the user group is not a sensitive user group, include the adding entity in the allowed entity list for the user group.

18. The non-transitory computer readable medium according to claim 15, wherein the instructions are further to cause the processor to:
following issuance of the alert,
remove the another user from the user group; and
block the adding entity from adding a further user to the user group.

19. The apparatus according to claim 1,
wherein the learning period comprises a period of time, and
wherein during a learning period, identify an entity that added a user to the user group during the learning period; enter an identification of the identified entity into an allowed entity list for the user group further comprises:
during the learning period, identify entities that added users to the user group; and
enter identifications of the identified entities into the allowed entity list for the user group.

20. The method according to claim 8,
wherein the information identifying at least one entity that added the users to the user group over the predefined period of time comprises information identifying a plurality of entities that added the users to the user group over the predefined period of time, and
wherein entering an identification of the at least one entity into an allowed entity list further comprises:
entering identifications of the plurality of entities that added the users to the user group over the predefined period of time into the allowed entity list.

\* \* \* \* \*